(12) United States Patent
Gostin et al.

(10) Patent No.: US 8,724,936 B2
(45) Date of Patent: May 13, 2014

(54) OPTICAL POLYMORPHIC COMPUTER SYSTEMS

(75) Inventors: Gary Gostin, Plano, TX (US); Michael Renne Ty Tan, Menlo Park, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 295 days.

(21) Appl. No.: 12/991,638

(22) PCT Filed: May 8, 2008

(86) PCT No.: PCT/US2008/005982
§ 371 (c)(1),
(2), (4) Date: Dec. 15, 2010

(87) PCT Pub. No.: WO2009/136896
PCT Pub. Date: Nov. 12, 2009

(65) Prior Publication Data
US 2011/0129225 A1 Jun. 2, 2011

(51) Int. Cl.
*G02B 6/12* (2006.01)
*G02B 6/28* (2006.01)
*H04B 10/00* (2013.01)

(52) U.S. Cl.
USPC ............. 385/14; 385/24; 385/47; 398/164

(58) Field of Classification Search
USPC ........................................................ 398/164
See application file for complete search history.

(56) References Cited

U.S. PATENT DOCUMENTS

| | | | |
|---|---|---|---|
| 4,234,969 A * | 11/1980 | Singh | 398/66 |
| 5,923,451 A * | 7/1999 | Karstensen et al. | 398/164 |
| 6,038,355 A * | 3/2000 | Bishop | 385/14 |
| 6,374,020 B1 | 4/2002 | Panniccia | |
| 6,661,940 B2 | 12/2003 | Kim | |
| 6,823,100 B1 | 11/2004 | Roemerman | |
| 7,266,295 B2 | 9/2007 | Ovadia et al. | |
| 2004/0208472 A1 | 10/2004 | McGlashan-Powell et al. | |
| 2008/0008471 A1 | 1/2008 | Dress | |
| 2009/0097851 A1 * | 4/2009 | Tan et al. | 398/82 |

FOREIGN PATENT DOCUMENTS

| | | |
|---|---|---|
| CN | 1099208 A | 2/1995 |
| CN | 1477795 A | 2/2004 |
| JP | 1993-297422 | 11/1993 |
| JP | 1996-278522 | 10/1996 |
| JP | 1988-001223 | 1/1998 |
| JP | 2001-356236 | 12/2001 |
| JP | 2002-131573 | 5/2002 |
| JP | 2003-066281 | 3/2003 |
| JP | 2003-514413 | 4/2003 |

OTHER PUBLICATIONS

Cicherl Kim, et al., "A Method for Rebroadcasting Signals in an Optical Backplane Bus System", Journal of Lightwave Technology, USA, IEEE, Jul. 2001, vol. 19, Issu.7, pp. 959-965.
M. Rode, et al., "Novel Optical Backplane Board-to-Board Interconnection", Integrated Optics and Optical Fibre Communications, 11th International Conference on, and 23rd European Conference on Optical Communications, USA, IEEE, Sep. 22, 1997, vol. 2, pp. 228-231.
Michael Tan, et al., "A High-Speed Optical Multi-Drop Bus for Computer Interconnections", 16th IEEE Symposium on High Performance Interconnects, 2008. HOTI '08, USA, IEEE, Aug. 26, 2008, pp. 3-10.
PCT Search Report, PCT/US2008/005982, Hewlett-Packard Development Company, L.P., Dec. 18, 2008.

* cited by examiner

*Primary Examiner* — Omar Rojas

(57) ABSTRACT

Embodiments of the present invention are directed to high-bandwidth, low-latency optical fabrics for broadcasting between nodes. In one embodiment, an optical fabric includes an optical communication path optically coupled to a broadcasting node and optically coupled to one or more broadcast receiving nodes. The optical fabric also includes a first optical element optically coupled to the optical communication path and configured to broadcast an optical signal generated by the broadcasting nodes onto the optical communication path, and one or more optical elements optically coupled to the optical communication path and configured to divert a portion the broadcast optical signal onto each of the one or more receiving nodes.

18 Claims, 9 Drawing Sheets

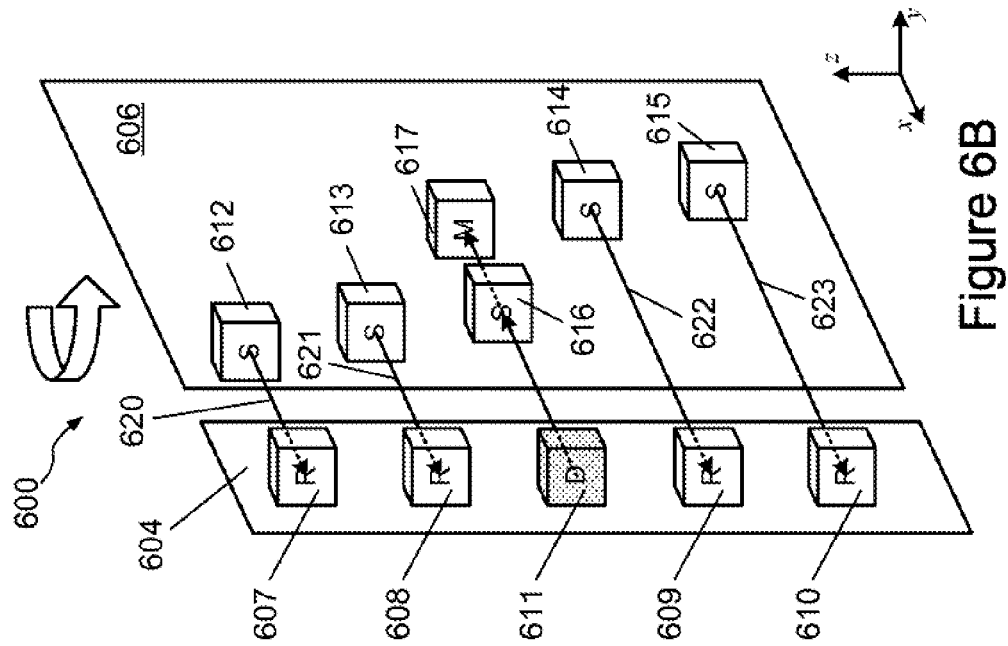
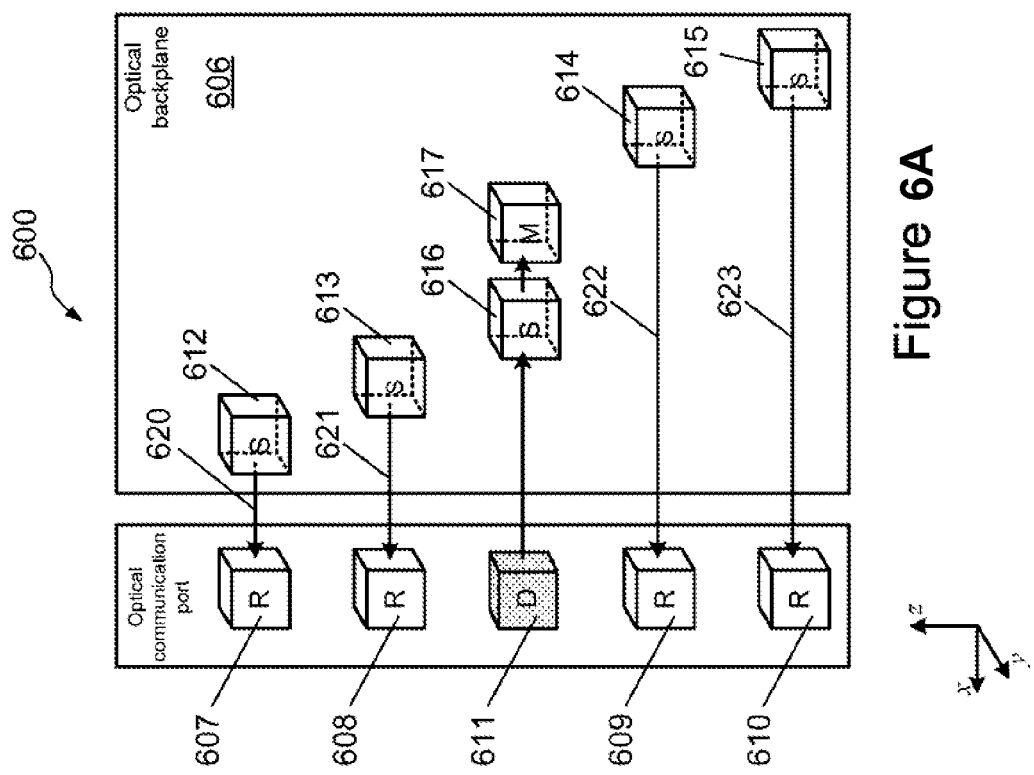
Figure 6A
Figure 6B

OPTICAL POLYMORPHIC COMPUTER SYSTEMS

TECHNICAL FIELD

Embodiments of the present are related to computer systems, and, in particular, to optical fabrics.

BACKGROUND

A blade system is a server chassis housing multiple, modular electronic circuit boards known as server blades or blades. The server chassis or blade enclosure, which can hold multiple blades, provides services such as power, cooling, networking, various interconnects and management. Each blade can be composed of more than one processor, memory, integrated network controllers, and other input/output ports, and each blade may also be configured with local drives and can connect to a storage pool facilitated by a network-attached storage, Fiber Channel, or iSCSI storage-area network.

FIG. 1 shows a blade system 100 composed of eight blades 102-109 mounted in a blade enclosure or chassis 110. Each blade can be electronically coupled to one or both switch fabrics 112 and 114 that provide input/output connectivity between the blades. However, the switch fabrics typically do not support coherent memory traffic. For example, in multi-processor systems, such as a blade system, there may be two or more processors in need of processing the same set of data at the same time. Provided none of the processors updates the data, the processors can share the data indefinitely. On the other hand, as soon as one processor updates the data, the other processors will be working on out-of-date data. As a result, data is often stored in memory partitions and limited to processing by one blade at a time. This makes it difficult to develop blades with different and specific capabilities, such as compute, memory, storage, and input/output, and link them together to meet the specific needs of customers and applications. Recently, blade systems have been developed with coherent memory switches disposed between blades and between blade systems. However, the bandwidth needed causes a substantial increase in the cost of these coherent switches, and the cables needed to interconnect blade systems are large and bulky. These switches add multiple hops of latency between blade systems, and cable management concerns can force a reduction in bisection bandwidth, which impacts performance. What is desired is a blade system providing high-speed, high-bandwidth, and low-latency communication across any group of blades that are physically contiguous.

SUMMARY

Embodiments of the present invention are directed to high-bandwidth, low-latency optical fabrics for broadcasting between nodes. In one embodiment, an optical fabric includes an optical communication path optically coupled to a broadcasting node and optically coupled to one or more broadcast receiving nodes. The optical fabric also includes a first optical element optically coupled to the optical communication path and configured to broadcast an optical signal generated by the broadcasting node onto the optical communication path, and one or more optical elements optically coupled to the optical communication path and configured to divert a portion of the broadcast optical signal to each of the one or more receiving nodes.

BRIEF DESCRIPTION OF THE DRAWINGS

FIG. 6A shows a side-planar view of an optical interface configured in accordance with embodiments of the present invention.

FIG. 6B shows an isometric view of the optical interface, shown in FIG. 6, configured in accordance with embodiments of the present invention.

DETAILED DESCRIPTION

Embodiments of the present invention are directed to high-bandwidth, low-latency optical fabrics for broadcasting optical signals between server blades of one or more blade systems. The optical fabric embodiments contain no central switch chips that would be single points of failure. The optical fabric embodiments enable the use of heterogeneous blades and eliminate chassis boundaries inherent in most computer architectures by providing seamless optical interconnections between blades of two or more blade systems in order to produce a polymorphic computer system. The optical fabric embodiments also enable any number of blades to broadcast simultaneously.

System embodiments of the present invention are described below with reference to server blades and blade systems. However, embodiments of the present invention are not intended to be so limited. Those skilled in the art will immediately recognize that optical fabric embodiments of the present invention can be used to provide optical communications between nodes of many different kinds of computer systems. A node can be a processor, memory, a core in a multi-core processing unit, a circuit board, a server blade, an external network connection, or any other data processing, storing, or transmitting device.

System embodiments of the present invention are also described below with reference to a number of different views of components. In order to assist readers in linking these views together, a number of Figures include a Cartesian coordinate system for reference so that readers can determine how a view of a component in one Figure relates to a view of the same component or different components in other Figures.

Figure 1:
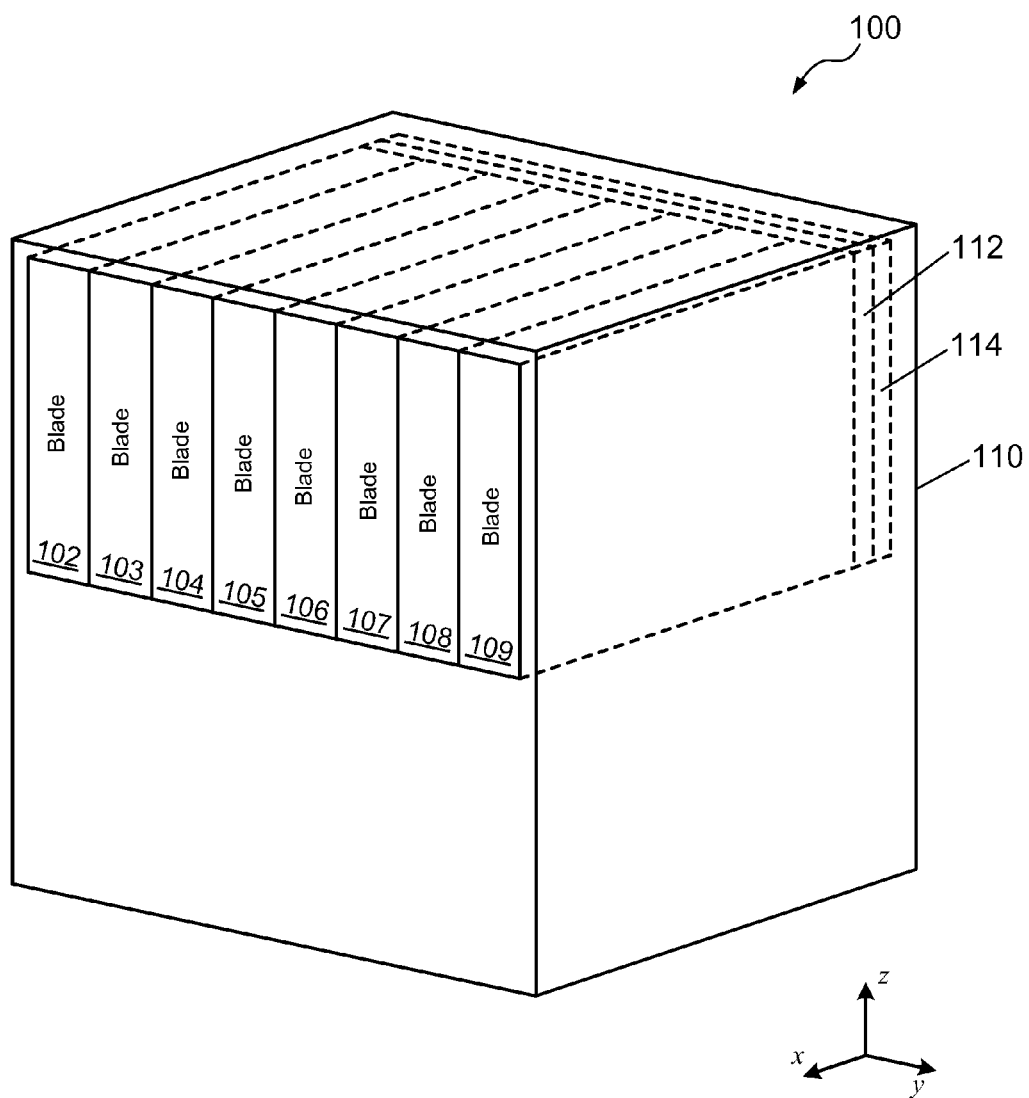
FIG. 1 shows a blade system composed of eight blades mounted in a blade enclosure.
Figure 2:
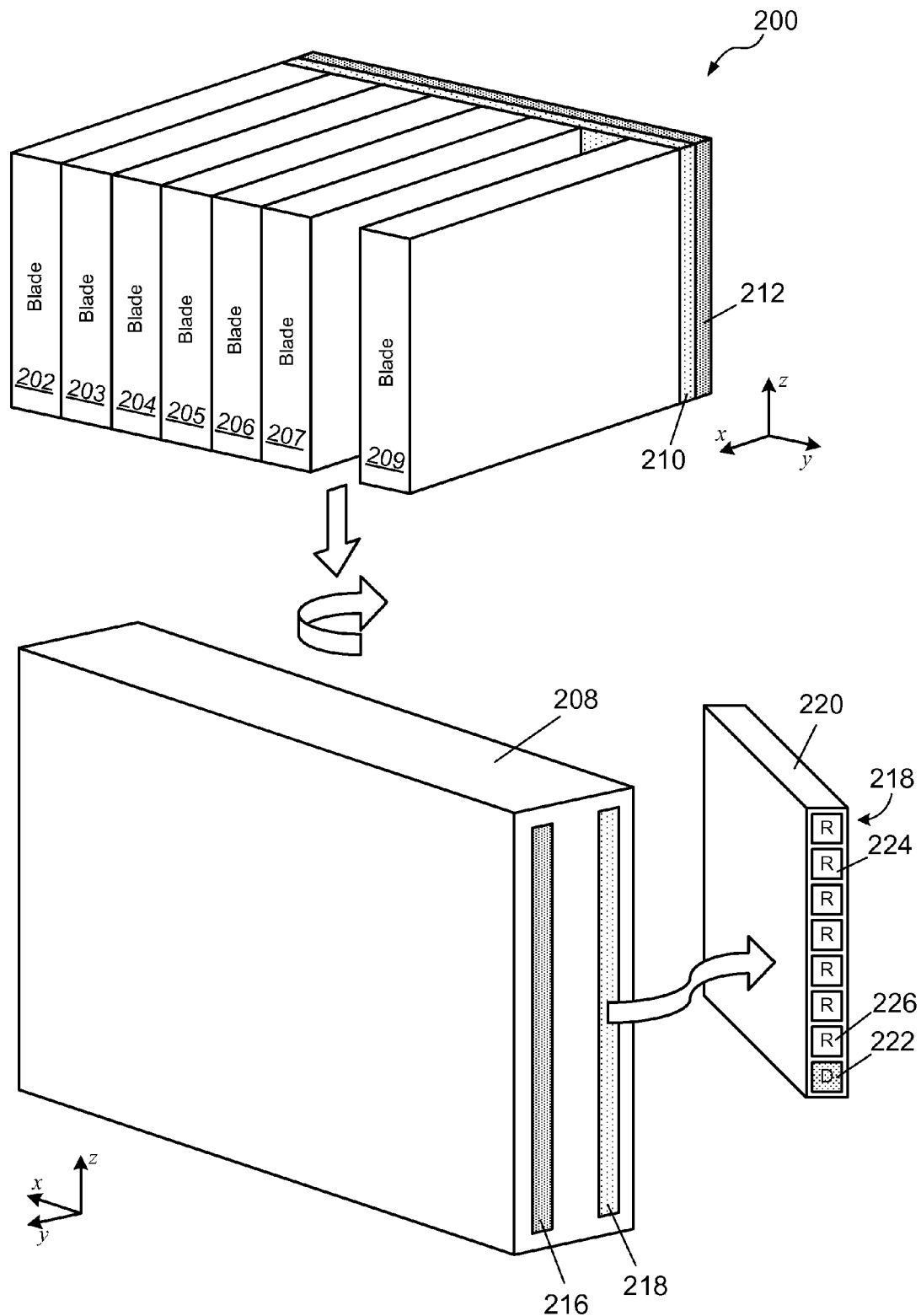
FIG. 2 shows an isometric view of a blade system with a server blade removed in accordance with embodiments of the present invention.

FIG. 2 shows an isometric view of a blade system 200 including eight server blades 202-209, an optical fabric 210, and a switch fabric 212 in accordance with embodiments of the present invention. Seven of the blades 202-207, and 209 are connected to the optical fabric 210 and the switch fabric 212. The blade 208 is disconnected from the blade system 200 and rotated approximately 90° about the z-axis to reveal a communication port 216 of a standard mezzanine card and an optical communication port 218 of an optical mezzanine card 220. The standard mezzanine card can be configured to provide standard electrical communications between the blade 208 and the switch fabric 212. The optical mezzanine card 220 is enlarged and removed from the blade 208 to reveal the arrangement of optical elements comprising the optical communication port 218. The optical mezzanine card 220 provides the blade 208 optical communications with the optical fabric 210. The optical elements include a single optical driver 222 denoted by the letter "D" disposed at the end of a column of optical receivers denoted by the letter "R." The blade 208 employs the driver 222 to send optical signals to the optical fabric 210, which, in turn, broadcasts the optical signals to the other blades 202-207 and 209. Each receiver corresponds to a particular blade and is employed by the blade 208 to receive optical signals that are broadcast from the corresponding blades over the optical fabric 210. For example, the blade 208 employs the receiver 224 to receive optical signals broadcast by the blade 202 to all of the blades 203-209 and employs the receiver 226 to receive optical signals broadcast by the blade 207 to all of the blades 202-206, 208, and 209.

Each blade is capable of broadcasting an optical signal on an optical fabric to all of the other blades. A blade that receives an optical signal is called a "receiving server blade" or "receiving blade" and a blade that broadcast an optical signal is called a "broadcasting server blade" or "broadcasting blade." The terms "broadcasting blade" and "receiving blade" are relative terms. For example, at one time, a first blade can be a broadcasting blade while a second blade can be a receiving blade of the optical signal broadcast by the first blade. At a later time, the second blade can be a broadcasting blade while the first blade can be a receiving blade of the optical signal broadcast by the second blade.

Broadcasting blades can broadcast optical signals over the optical fabric in the form of packets with headers. Each header identifies a particular receiving blade as the destination for data carried by the optical signals. All of the blades in optical communication with the optical fabric receive the optical signals. However, because the header of each packet identifies a particular receiving blade as the destination for the data, only the receiving blade identified by the header actually receives and operates on the optical signals. The other receiving blades not identified by the header discard the optical signals.

The optical fabric 210 also enables a broadcasting blade to send a packet to multiple receiving blades, providing a true functional broadcast capability. This is useful for certain cache coherency protocols. It can also be used to merge multiple packets targeted for different receiving blades into a single multi-packet, where each receiving blade will consume only the portion of the multi-packet that applies to it. This helps to conserve bandwidth in situations where a small amount of information needs to be sent to each of several receiving blades, such as flow control information.

Broadcast optical signals are transmitted along optical communication paths of the optical fabric 210. The term "optical communication path" refers to optical interconnects and to light transmitted through free space. The optical interconnects can be optical waveguide or hollow waveguides. An optical waveguide can be a solid core ridge waveguide. Hollow waveguides are composed of a tube with an air core. The structural tube forming the hollow waveguide can have inner core materials with refractive indices greater than one or less than one. The tubing can be composed of a suitable metal, glass, or plastic and metallic and dielectric films can be deposited on the inner surface of the tubing. The hollow waveguides can be hollow metal waveguides with high reflectivity metal coatings in the interior. The air core can have a cross-sectional shape that is circular, elliptical, square, rectangular, or any other shape that is suitable for guiding light. Because the waveguide is hollow, optical signals can travel along the core of a hollow waveguide at the speed of light in air or vacuum.

Figure 3A:
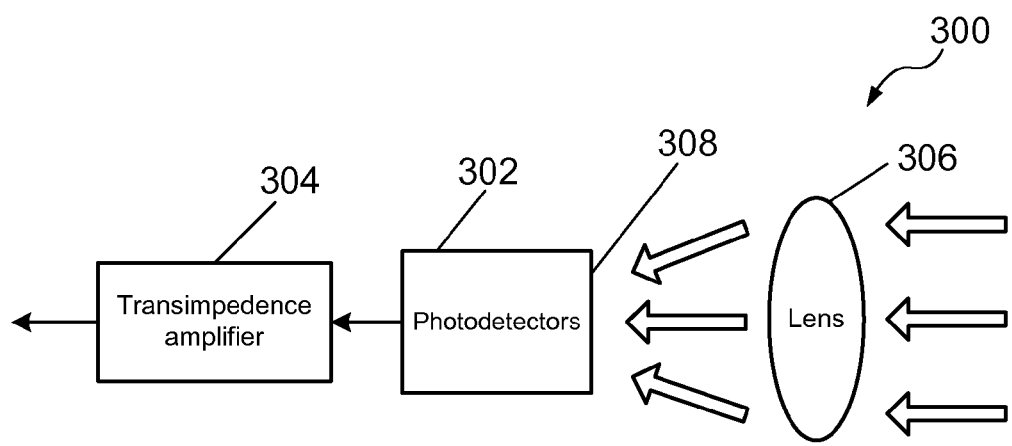
FIG. 3A shows a schematic representation of a receiver configured in accordance with embodiments of the present invention.

FIG. 3A shows a schematic representation of a receiver 300 configured in accordance with embodiments of the present invention. The receiver 300 can be composed of an array of one or more photodetectors 302, a transimpedence amplifier 304, and a lens 306. The photodetector 302 can be a p-n or p-i-n junction photodiode, or n-p-n or p-n-p phototransistor. As shown in the example of FIG. 3A, the lens 306 is positioned and configured to focus incident optical signals onto the detector surface 308 of the photodetectors 302. The photodetectors 302 converts the incident optical signal into an electrical signal that is transmitted to the electronically coupled transimpedance amplifier 304, which amplifies the electrical signal and places it on a signal line that is electronically coupled to another electronic device, such as a processor or memory (not shown). In addition to amplifying the electrical signal output from the photodetectors 302, the transimpedance amplifier 304 reduces the signal-to-noise ratio and provides a faster response time than using a resistor after the photodetector 302.

Figure 3B:
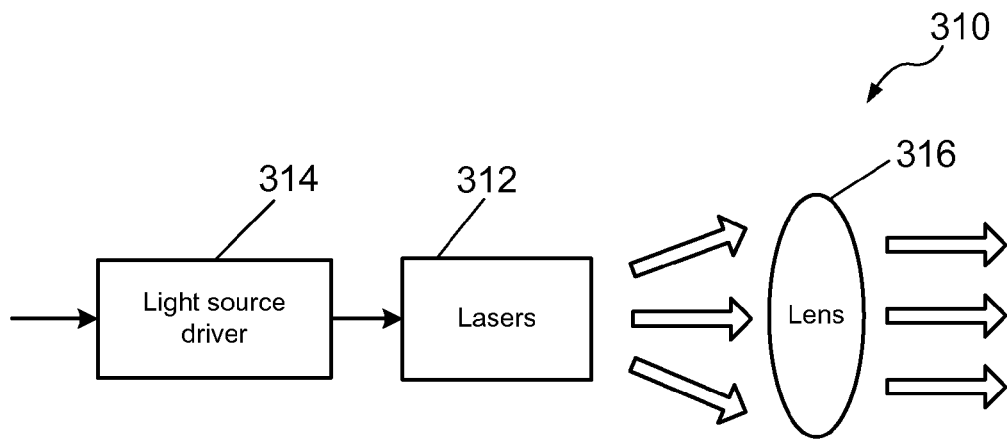
FIG. 3B shows a schematic representation of a driver configured in accordance with embodiments of the present invention.

FIG. 3B shows a schematic representation of a driver 310 configured in accordance with embodiments of the present invention. The driver 310 includes a light source 312, a laser driver 314, and a lens 316. The light source 312 can be composed of an array of vertical-cavity surface-emitting lasers, distributed feedback lasers, quantum well lasers, multiple quantum well lasers, double heterostructure lasers, light-emitting diodes or any other suitable devices for emitting optical signals. The light source 302 is electronically coupled to the light source driver 304 which receives electrical signals from an electronic device, such as a processor or memory (not shown). The lens is positioned and configured to focus and direct the light output from the light source 302. The lens may also be used to collimate the light output of the light source 312 so as to excite the low loss modes of the hollow waveguide into which the light is injected. The light source driver 304 can be an integrated circuit that is configured to drive the light source 302 with low and high electrical voltages corresponding to the bits "0" and "1." The variation in the electrical signal produces distinctive corresponding low and high light intensities that are used to generate an optical signal carrying the same information as the electrical signal.

The optical fabric provides relatively lower power and lower latency communications between blades of a single blade system and between blades of two or more separate blade systems than conventional switch fabrics. The optical fabric also enables more than one blade to broadcast at a time.

Figure 4:
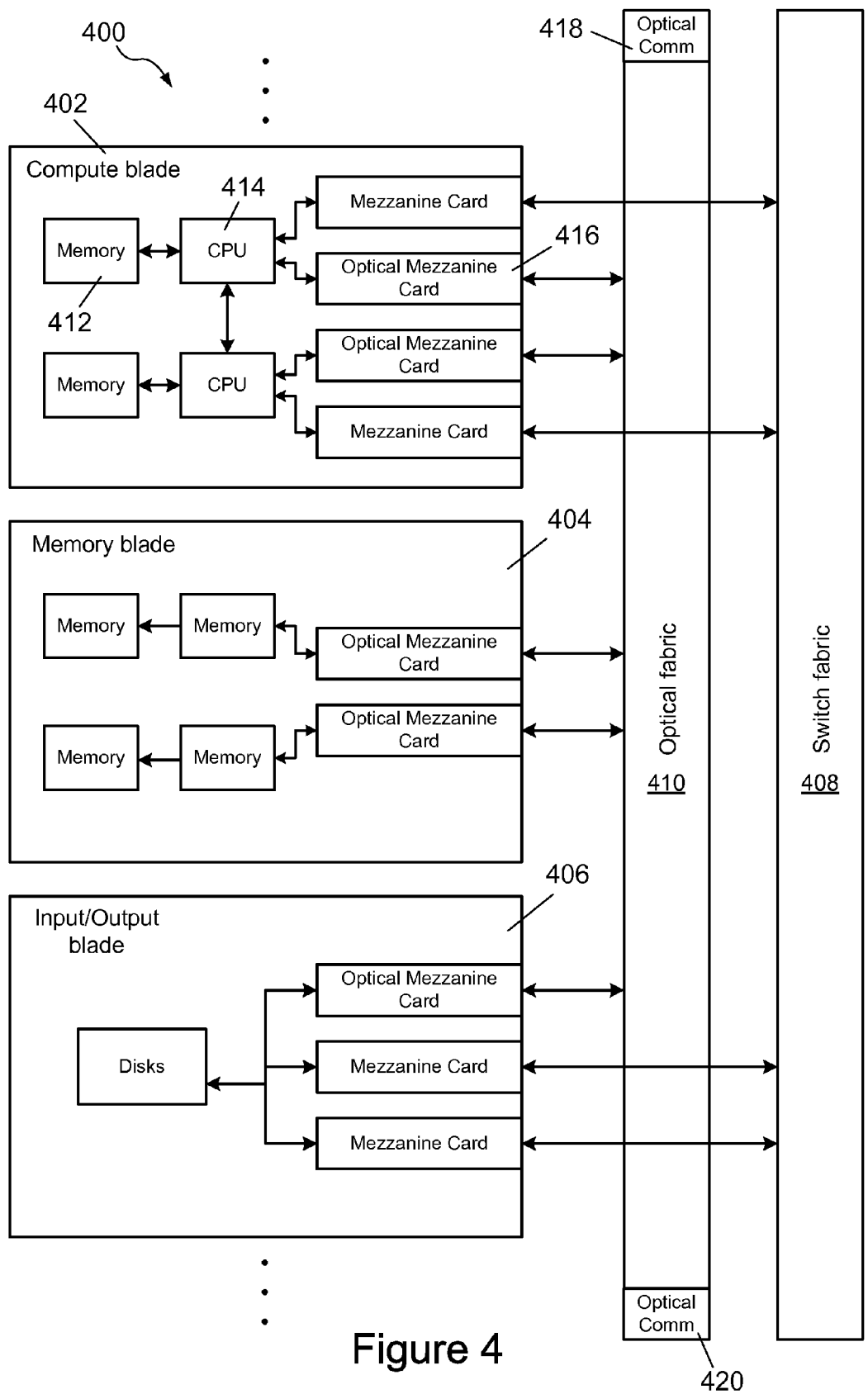
FIG. 4 shows a schematic representation of a polymorphic computer system configured in accordance with embodiments of the present invention.

FIG. 4 shows a schematic representation of a polymorphic computer system 400 configured in accordance with embodiments of the present invention. The computer system 400 includes a combination of heterogeneous blades, such as a compute blade 402, a memory blade 404, and an input/output blade 406. The compute blade 402 includes two central processing units ("CPUs"), each of which is in electrical communication with local memory, such as dual in-line memory modules ("DIMMs"). The memory blade 404 includes memory, which can also be additional dynamic random access memory ("DRAM") arranged in DIMMs. The I/O blade 406 includes a number of disk drives that can be used for storing relatively large quantities of data. The blades 402 and 406 are each configured with standard mezzanine cards for electrical communication with the switch fabric, and the blades 402, 404, and 406 include optical mezzanine cards for optical communication with the optical switch fabric 410. Blades 402, 404 and 406 are just examples of blades that group selected quantities of computer resources such as processors, memory, storage and I/O. Blades with other groupings of resources can also be supported by the present invention.

As shown in the example of FIG. 4, the optical fabric provides optical communication between the blades 402, 404, and 406. In other words, the optical fabric 410 makes it possible to optically interconnect heterogeneous blades that have specific support functions, such as the memory blade 404 and the I/O blade 406 that adds storage and network capacity. Compute blades are typically fabricated with only enough memory to support specific applications of the day and, therefore, may not have enough memory to support applications that demand larger amounts of memory when added at a later time. The memory blade 404 can be used as a memory resource for applications with higher memory demand than is available on the compute blade 402. For example, suppose the local memory 412 of the CPU 414 is full and the CPU 414 is in need of storing data generated by an application running on the compute board 402. The CPU 414 can then direct the optical mezzanine card 416 to broadcast optical signals in the form of packets carrying the data to all of the blades in optical communication with the optical fabric 410. Each of the optical signal packets includes a header identifying the memory blade 404 as the destination. All of the blades in optical communication with the optical fabric 410 receive the optical signals. However, because the header of each packet identifies the memory blade 404 as the destination, only the memory blade 404 operates on the optical signals and stores the data.

The optical fabric 410 seamlessly spans blade chassis boundaries, which enables heterogeneous blades to be interconnected to implement a polymorphic computer. For example, the optical fabric 410 eliminates chassis boundaries of the blade system 400 because the optical fabric 410 is configured with optical communication interconnects 418 and 420 that enable the optical fabric to be optically coupled to optical fabrics of other blade systems. As a result, the optical fabric 410 provides for polymorphic computing because not only can specialized blades be added to any one blade system employing the optical fabric 410, but blade systems can be seamlessly optically coupled together via the optical communication interconnects. Note that the optical fabric 410 and associated optical mezzanine cards provides a small incremental cost for non-polymorphic configurations, because the optical fabric can be removed and the optical mezzanine cards can also be removed and corresponding slots in the blades can be used to support standard mezzanine cards.

Figure 5:
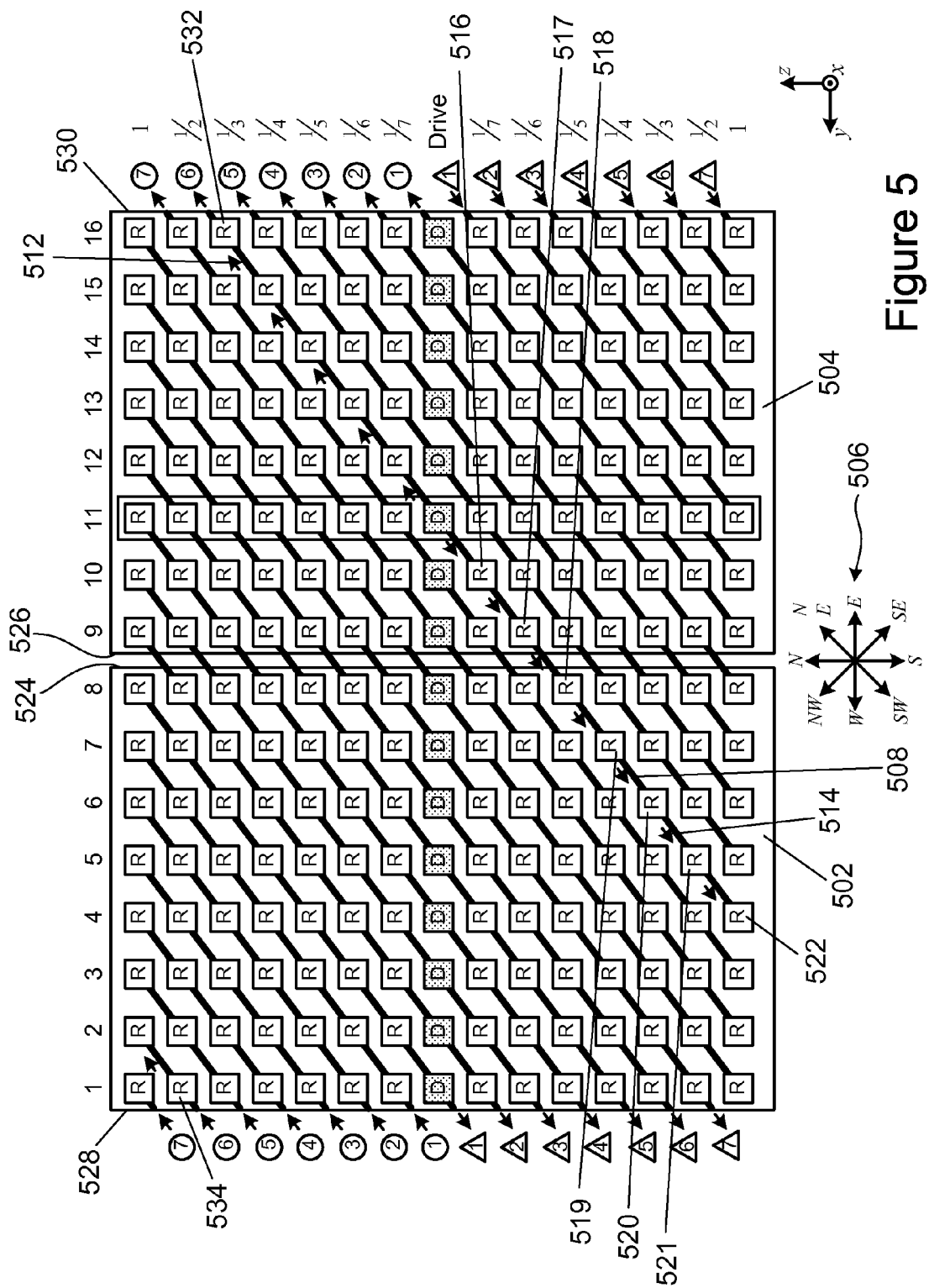
FIG. 5 shows a first optical fabric topology for two optical fabrics configured in accordance with embodiments of the present invention.

FIG. 5 shows a schematic representation of an optical fabric topology for two optical fabrics 502 and 504 configured in accordance with embodiments of the present invention. The optical fabrics 502 and 504 are each disposed within a different chassis of two different blade systems (not shown). The first optical fabric 502 supports eight blades, each with an optical communication port, and the second optical fabric 504 supports eight blades, each with an optical communication port. As shown in the example of FIG. 5, blades are labeled 1-16, and the optical communication ports are identical across all blades. Each optical communication port is composed of 14 receivers and a single driver, where the driver is located between two sets of seven receivers with the receivers and driver arranged in a single column running parallel to the z-axis.

Each receiver of an optical communication port receives broadcast optical signals from the driver of only one of the other optical communication ports as follows. FIG. 5 includes a compass rose 506 that lies within the yz-plane of the optical fabrics 502 and 504 and is used to describe the direction optical signals travel along optical communication paths within and between the optical fabrics 502 and 504. The optical fabrics 502 and 504 are configured to split an optical signal output from each driver into two substantially identical optical signals that are broadcast in opposite directions. One of the optical signals is broadcast to a portion of the optical communication ports in the NE direction and the other optical signal is broadcast to the remaining portion of the optical communication ports in the SW direction. Lines running from NE to SW, such as line 508, represent optical communication paths the optical signals follow as the optical signals pass one receiver of each optical communication port. For example, the optical fabric 504 splits the optical signal output from the driver of an optical communication port 11 into two substantially identical optical signals, each with approximately equal optical power. The first optical signal is broadcast to one receiver in each of the optical communication ports 12-16 and 1-2 along the optical communication path 508 in the NE direction, as indicated by directional arrows, such as directional arrow 512. The second optical signal is broadcast to one receiver in each of the optical communication ports 4-10 along the optical communication path 508 in the SW direction, as indicated by directional arrows, such as directional arrow 514. In general, each receiver located along an optical communication path receivers about the same amount of optical power from a broadcast optical signal and no one receiver receives optical signals from more than one driver.

Note that the optical communication paths within an optical fabric can be composed of optical interconnects, such as optical waveguides and hollow waveguides, or optical communication paths can be optical signals propagating in free space. However, in order for the optical signals to pass between receivers located along adjacent edges 524 and 526 of the chassis 502 and 504, respectively, optical interconnects are needed. For example, an optical interconnect is needed to carry the SW bound optical signal between the receiver 517 located along the edge 526 of the chassis 504 to the receiver 518 located along the edge 524 of the chassis 502. Relatively longer optical interconnects are needed to pass optical signals between receivers located along the non-adjacent edges 528 and 530. FIG. 5 includes circled numbers along the edges 528 and 530 representing the optical communication path NE bound optical signals follow after passing receivers located along the edge 530 to reach the receivers located along the edge 528. For example, circled number 5 represents an optical interconnect that carries an optical signal from the receiver 532 to the receiver 534, where the optical signal continues in the NE direction to one receiver of each of the optical communication ports 1-3. Likewise, numbers in triangles located along the edges 528 and 530 represent the optical communication path SW bound optical signals follow after passing receivers located along the edge 528 to reach the receivers located along the edge 530.

Note that the optical communication path 508 enables a blade associated with optical communication port 11 optically communicate with 14 of the optical communication ports. In particular, optical communication port 11 optically communicates with optical communication ports 4-10 in the SW direction and optical communication ports 12-16 and 1-2 in the NE direction. Optical communication ports that are located farther away, such as optical communication port 3 cannot communicate directly with optical communication port 11. Thus a hop from either optical communication port 2 or 4 to optical communication port 3 is needed to complete the broadcast.

In general, an optical communication port can optically communicate directly with N optical communication ports in the one direction along an optical communication path and with N other optical communication ports in the opposite direction along the same optical communication path. However, optical communication ports that are located farther away than N either cannot be communicated with or require one or more hops through intermediate blades. This reduces the number of optical receivers for a system with M blades from $M^2-M$ to $2 \times M \times N$.

In certain embodiments, optical repeaters can be placed along the optical communication paths or at the ends of the optical communication paths near the edges so that optical signals can be transmitted to other optical communication ports on optical communication paths of adjacent optical fabrics, such as adjacent optical fabric 502 and 504. A repeater is a device that receives an optical signal, amplifies the optical signal, and then retransmits the optical signal along the same optical communication path or on a different optical communication path of an adjacent optical fabric. Repeaters overcome the attenuation caused by free-space or optical interconnect loss. A series of repeaters make possible the extension of an optical signal over a relatively long optical communication path. In addition to strengthening the optical signals, repeaters can also be placed along the optical communication paths to remove noise or other unwanted aspects of the optical signals.

The optical interconnects between adjacent edges of optical fabric and the loop around optical interconnects used to link optical communication paths of non-adjacent edges effectively eliminate physical chassis boundaries. As a result, the optical communication paths of any number of blade systems can be seamlessly linked together in a similar manner. A partition can be formed from any group of blades within a distance of N of each other, even if they span physical chassis boundaries. Because server blades of various types in multiple chasses can be dynamically grouped to form a computer partition, the resulting computer systems are polymorphic.

The optical fabric is configured with optical elements, such as beamsplitters and mirrors, that are aligned with the receivers and driver of each optical communication port. FIG. 6A shows a side-planar view of an optical interface 600, and FIG. 6B shows an isometric view of the same optical interface 600 configured in accordance with embodiments of the present invention. In the example of FIG. 6, and in subsequent Figures, receivers, beamsplitters, drivers, and mirrors are optical elements represented by boxes labeled "R," "S," "D," and "M," respectively. FIG. 6 reveals one possible arrangement of beamsplitters and mirrors that are located opposite the receivers and driver of an optical communication port 604. The optical interface 600 optically couples the optical communication port 604 of an optical mezzanine card with a portion of optical elements of an optical backplane 606 of an optical fabric. The optical communication port 604 includes four receivers 607-610 and a driver 611, and the optical backplane 606 includes five beamsplitters 612-616 and a mirror 617.

The optical interface 600 is formed by optically coupling receivers 607-610 and a driver 611 of the port 604 with corresponding beamsplitters 612-616 and mirror 617 of the optical fabric 606 that lie in substantially the same xz-plane. The beamsplitters 612-615 receive optical signals from other beamsplitters lying in different planes (not shown) of the optical fabric and split a portion of the optical signals off to the receivers 607-610, as indicated by directional arrows 620-623, respectively. The driver 611 outputs an optical signal to the beamsplitter 616, which, in turn, splits a first portion off toward a beamsplitter lying in a first plane (not shown) and a second portion toward the mirror 617 that directs the second portion to a second plane (not shown).

Figure 7:
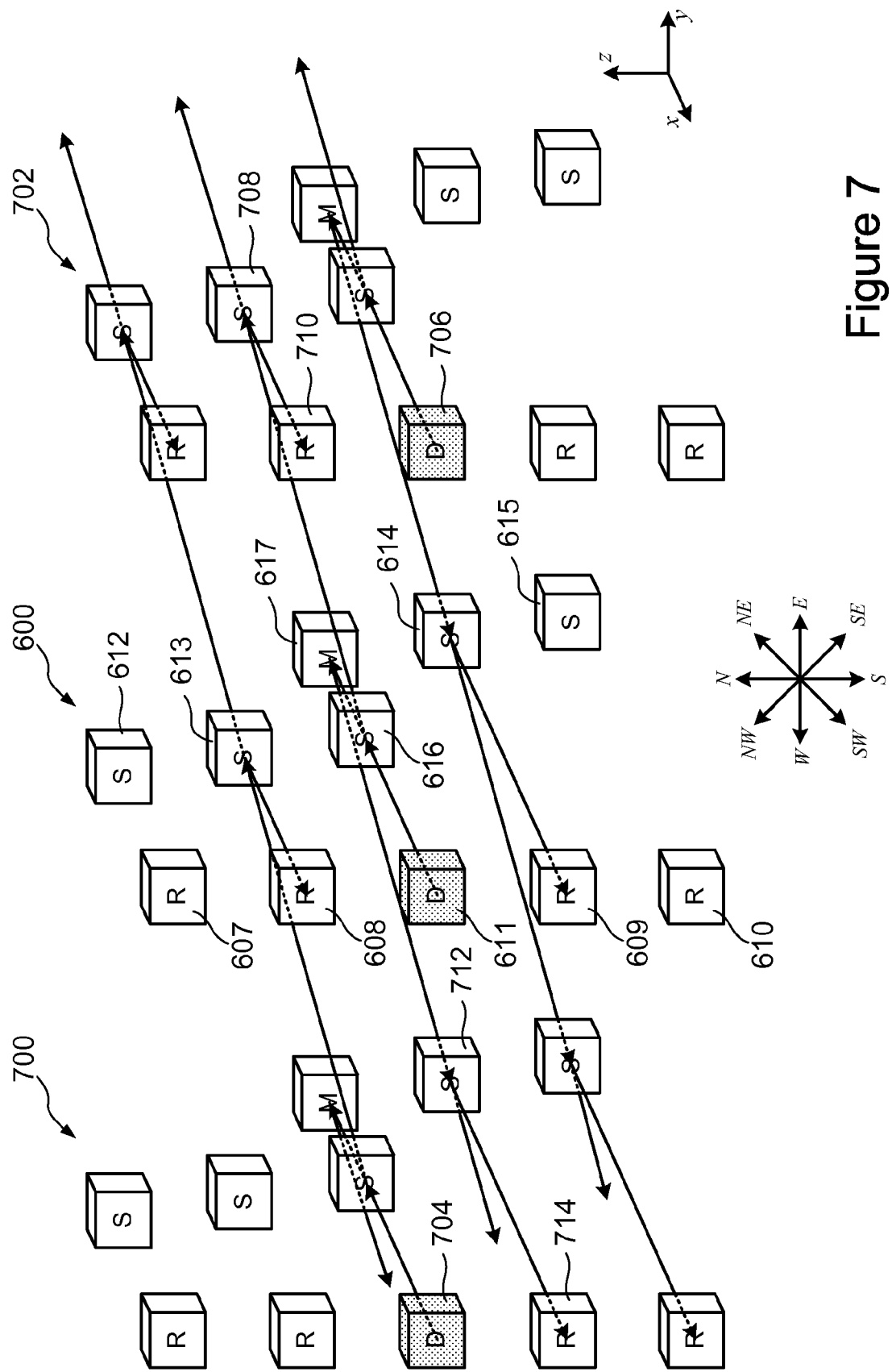
FIG. 7 shows an isometric view of the optical interface shown in FIG. 6 disposed between two adjacent optical interfaces in accordance with embodiments of the present invention.

FIG. 7 shows an isometric view of the optical interface 600 disposed between two adjacent optical interfaces 702 and 704 in accordance with embodiments of the present invention. In FIG. 7, directional arrows represent the optical communication path of broadcast optical signals generated by drivers 611, 704, and 706 through a switch fabric. The beamsplitters and mirrors are configured and oriented to direct optical signals in the NE and SW directions, as described above with reference to FIG. 5. For example, driver 611 outputs an optical signal to the beamsplitter 616 that splits the optical signal into a first portion that is sent to beamsplitter 708 and a second portion that is sent to the mirror 617. The beamsplitter 708 splits off a portion of the optical signal toward the receiver 710 and another portion of the optical passes onto a beamsplitter in an adjacent optical interface (not shown). The mirror 617 is positioned to direct the second portion of the optical signal output from the driver 611 to the beamsplitter 712, which, in turn, splits off a portion that is directed to the receiver 714 and another portion that is directed to the beamsplitter of an adjacent optical interface (not shown).

In general, the beamsplitters disposed along an optical communication path are configured to split off a portion of the optical signal to each receiver located along the optical communication path so that each receiver receives about the same amount of optical power. In other words, the beamsplitters are configured to divert 1/nth of the total optical power of an optical signal output from a driver on an optical communication path in one broadcast direction, where n is the number of receivers located along the optical communication path in one broadcast direction. Because each beamsplitter reduces the amount of optical power in the optical signal, the beamsplitters are not all configured to divert the same fraction of optical power. Instead, each beamsplitter can be configured to divert a fraction of the optical signal power in accordance with the equations:

$$R_m = \frac{1}{(n-m+1)}$$

$$T_m = \frac{(n-m)}{(n-m+1)}$$

where m is an integer representing a receiver located along the optical communication path in one broadcast direction, $1 \leq m \leq n$, 1 represents the receiver closest to the driver of the optical signal and n represents the nth receiver located farthest from the driver along the optical communication path; $R_m$ represents the fraction of the optical signal diverted to the mth receiver; and $T_m$ represents the fraction of the optical signal transmitted past the mth receiver to the next receiver.

Returning to FIG. 5, a column of fractions corresponds to the fraction $R_m$ of optical power diverted to receivers along the optical communication paths. For example, there are n=7 receivers 516-522 located along the optical communication path 508 in the SW direction. The beamsplitters located within the optical fabrics 502 and 504 are configured to divert substantially the same optical power to the receivers 516-522 in accordance with $R_m$ and $T_m$. The first receiver 516 (m=1) receives approximately ½ of the optical power of the optical signal traveling in the SW direction output from the driver of the optical communication port 11 506. The second receiver 517 (m=2) receives approximately ⅙ of the optical power of the remaining optical signal after the receiver 516. Subsequent receivers 518-521 (m=3, 4, 5, 6, 7) correspondingly receive approximately ⅕, ¼, ⅓, and ½ of the optical signal remaining after optical passes each receiver. Finally, the $7^{th}$ receiver 522 receives all of the remaining optical signal. In other words, each of the receivers 514-521 receives about $\frac{1}{7}^{th}$ of the total optical power output from the driver of the optical communication port 11 506 along the optical communication path 508 in the SW direction.

In other embodiments, the optical fabric can be fabricated from a sheet of rigid material onto which optical interconnects have been assembled thus providing the optical communication paths. In particular, hollow waveguides can be embossed onto the rigid sheet providing the optical communication paths to broadcast the optical signals. For the case of solid core plastic optical waveguides, the beamsplitter may be a diffraction grating designed to diffract a portion of the power out of the waveguide into a detector. For the case of the hollow waveguide, a grating, instead of a beamsplitter may be used to tap off the desired amount of power. Scattering elements such as triangular shapes embedded into the waveguide may also be used to reflect a desired amount of light out of the waveguide to the receivers.

Figure 8:
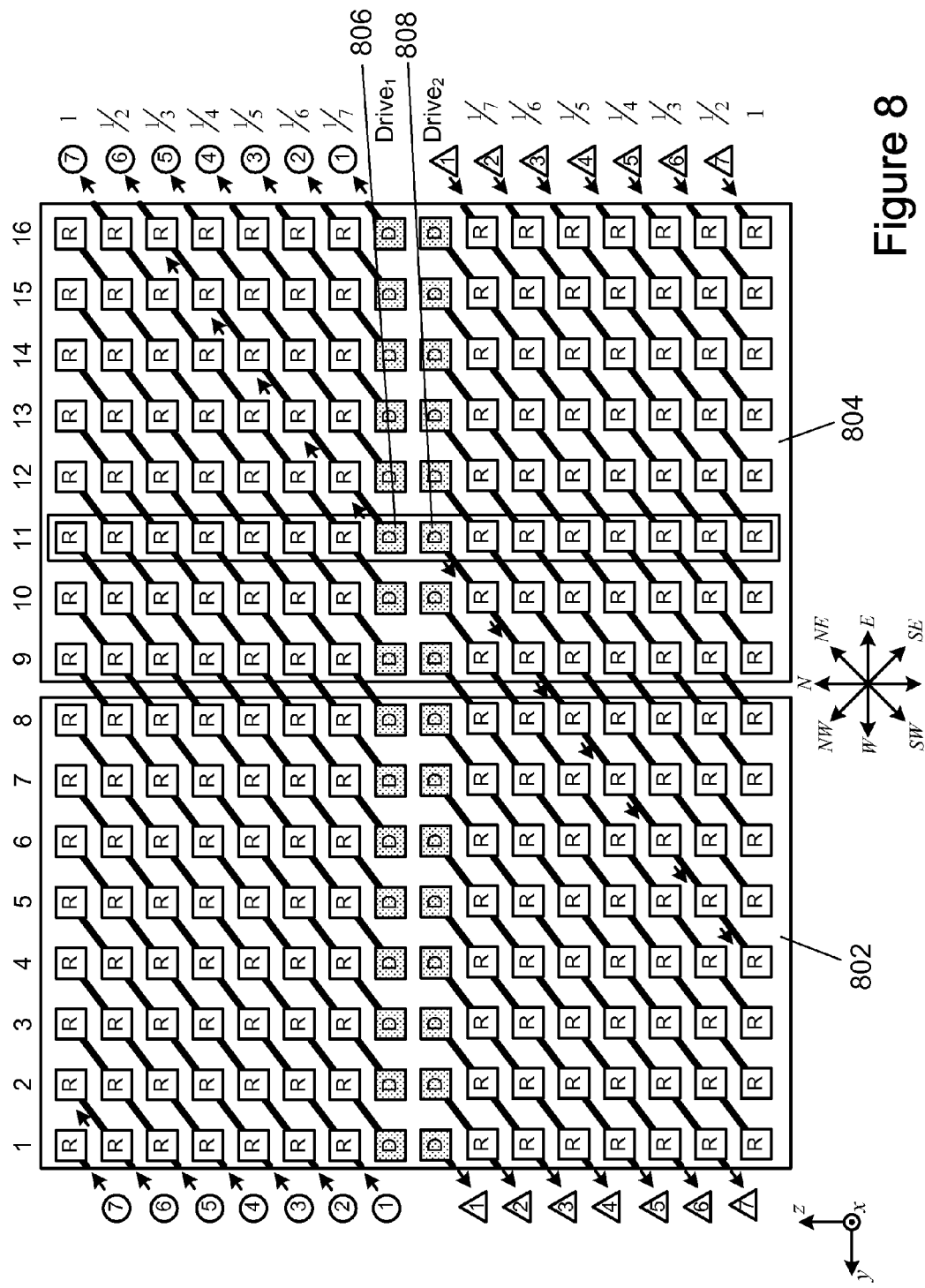
FIG. 8 shows a second optical fabric topology for two optical fabrics configured in accordance with embodiments of the present invention.

In other embodiments, the optical fabric can be configured to accommodate various kinds of optical communication ports, such as optical communication ports configured with two or more drivers. Two or more drivers per optical communication port may be needed when there is not enough optical power produced by a single driver to reach all of the receivers along an optical communication path. FIG. 8 shows a schematic representation of an optical fabric topology for two optical fabrics 802 and 804 configured in accordance with embodiments of the present invention. The optical fabrics 802 and 804 are each disposed within a different chassis of two different blade systems (not shown). The optical fabrics 802 and 804 are configured nearly identical to the optical fabrics 502 and 504, shown in FIG. 5, except the optical fabrics 802 and 804 are configured to support optical communication ports having 14 receivers and two drivers arranged in a single column running parallel to the z-axis. In particular, the optical fabrics 802 and 804 are configured with mirrors and no beamsplitters across from the drivers. The mirrors can be positioned so that a first optical signal generated by a first driver is broadcast in the NE direction, and a second optical signal generated by a second driver of the same optical communication port is broadcast in the SW direction. For example, the optical fabric 804 is configured so that a first driver 806 of an optical communication port 11 broadcast a first optical signal in the NE direction to receivers in the optical communication ports 12-16 and 1-2. The optical fabric 804 is also configured so that a second driver 810 of the same port 11 808 broadcasts a second optical signal in the SW direction to receivers in the optical communication ports 4-10.

Figure 9:
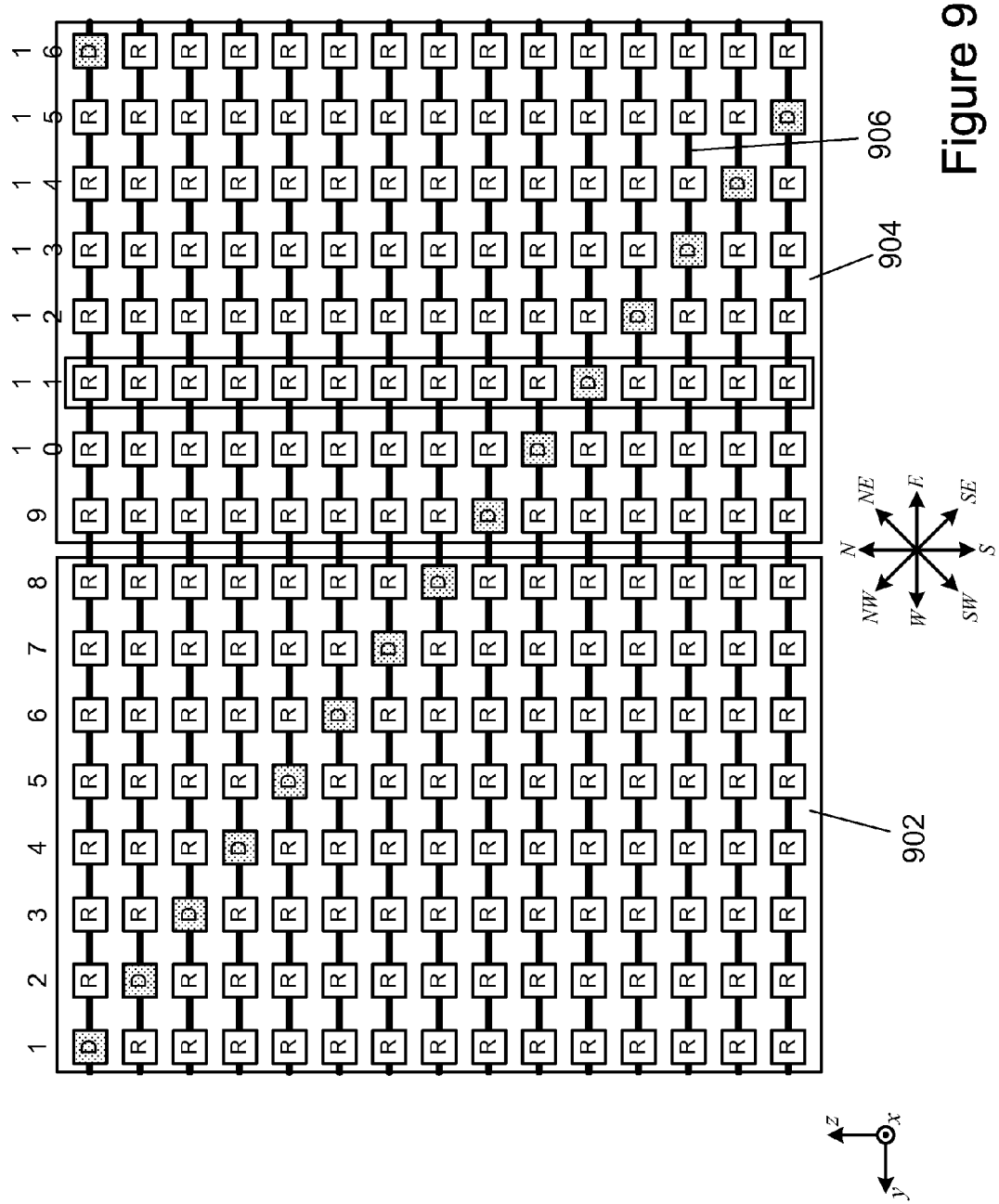
FIG. 9 shows a third optical fabric topology for two optical fabrics configured in accordance with embodiments of the present invention.

In still other embodiments, the optical fabric can be configured to broadcast optical signals in east and west directions. FIG. 9 shows a schematic representation of an optical fabric topology for two optical fabrics 902 and 904 configured in accordance with embodiments of the present invention. The optical fabrics 902 and 904 are each disposed within a different chassis of two different blade systems (not shown). The first optical fabric 902 supports eight optical communication ports and the second optical fabric 904 supports seven optical communication ports. Note that a single blade can use more than one of the optical communication ports. In FIG. 9, the optical communication ports are labeled 1-15. As shown in the example of FIG. 9, the drivers of each optical communication port are positioned along a diagonal running along the NW and to the SE of the optical fabrics 902 and 904. The optical fabrics 902 and 904 are configured to split an optical signal output from each driver into two substantially identical optical signals that are broadcast in opposite directions. Lines running from E to W, such as line 906, represent the optical communication path the optical signals follow as the optical signals pass one receiver of each optical communication port. One of the optical signals is broadcast to a portion of the optical communication ports in the E direction and the other optical signal is broadcast to the remaining portion of the optical communication ports in the W direction.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purposes of illustration and description. They are not intended to be exhaustive of or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated.

It is intended that the scope of the invention be defined by the following claims and their equivalents:

1. An optical fabric comprising:
    an optical backplane of the optical fabric, the optical backplane configured to divert a portion of a given optical signal broadcast by a broadcasting node on a given optical communication path to an optical communication port of an optical mezzanine card, and the optical backplane being configured to direct another optical signal generated by the optical communication port of the mezzanine card onto another optical communication path, wherein the given and the another optical communication paths are optically coupled to two or more receiving nodes;
    a given optical element comprising:
        a beamsplitter configured to split an optical signal generated by the broadcasting node into first and second substantially identical optical signals; and
        a mirror optically coupled to the given optical communication path and configured to receive and reflect a given optical signal of the first and second substantially identical optical signals provided by the beamsplitter and to broadcast substantially the entire given optical signal onto the given optical communication path to provide a broadcast optical signal; and
    one or more optical elements optically coupled to the given optical communication path and configured to divert a portion of the broadcast optical signal toward two or more of the two or more receiving nodes.

2. The optical fabric of claim 1 wherein the given optical communication path further comprises one of:
an optical waveguide;
a hollow waveguide; and
light propagating in free space.

3. An optical fabric comprising:
an optical backplane of the optical fabric, the optical backplane configured to divert a portion of a given optical signal broadcast by a broadcasting node on a given optical communication path to an optical communication port of an optical mezzanine card, and the optical backplane being configured to direct another optical signal generated by the optical communication port of the mezzanine card onto another optical communication path, wherein the given and the another optical communication paths are optically coupled to two or more receiving nodes;
a given optical element comprising a mirror optically coupled to the given optical communication path and configured to receive and reflect an optical signal generated by the broadcasting node and to broadcast the optical signal onto the given optical communication path to provide a broadcast optical signal; and
one or more optical elements optically coupled to the given optical communication path and configured to divert a portion of the broadcast optical signal toward two or more of the two or more receiving nodes, wherein the given optical element further comprises:
a beamsplitter configured to split the broadcast optical signal into a given and another substantially identical optical signals; and
the given optical signal traveling on the given optical communication path in a given direction;
wherein the mirror is configured to direct the second optical signals to travel on the given optical communication path in a another direction opposite the given direction.

4. The optical fabric of claim 1 wherein the one or more optical elements further comprise another beamsplitter configured to divert a portion of the broadcast signal to a corresponding receiving node of the two or more receiving nodes so that each receiving node of the two or more receiving nodes receives about the same amount of optical power from the broadcast signal.

5. The optical fabric of claim 1 wherein the nodes further comprise one or more of: a processor, a memory controller, a server blade of a blade system, a core in a multi-core processing unit, a circuit board, an external network connection.

6. An optical fabric interface comprising:
an optical communication port of an optical mezzanine card; and
an optical backplane of an optical fabric, the optical backplane configured to divert a portion of a first optical signal broadcast on a first optical communication path to the optical communication port, and the optical backplane configured to direct a second optical signal generated by the optical communication port onto a second optical communication path, the optical backplane comprising:
a given optical element comprising:
a beamsplitter coupled to the first optical communication path and configured to split the first optical signal generated by a broadcasting node into first and second substantially identical optical signals; and
a mirror optically coupled to the first optical communication path and configured to receive and reflect a given optical signal of the first and second substantially identical optical signals and to broadcast substantially the entire given optical signal onto the first optical communication path; and
another optical element optically coupled to the first optical communication path and configured to divert the portion of the first optical signal toward the optical communication port.

7. The interface of claim 6 wherein the optical communication port further comprises:
at least one receiver configured to receive the portion of the first optical signal; and
a driver configured to generate the second optical signal.

8. The interface of claim 6 wherein the optical backplane further comprises a beamsplitter configured to divert the portion of the first optical signal to the optical communication port.

9. The interface of claim 6 wherein the optical backplane further comprises a mirror configured to direct the second optical signal onto the second optical communication path.

10. The optical fabric of claim 6 wherein the first and second optical communication paths further comprise an optical waveguide, a hollow waveguide, or light propagating in free space.

11. A computer system comprising:
N number of nodes, where N is a whole number greater than or equal to three; and
an optical backplane of an optical fabric having a number of optical communication paths, wherein each of the number of optical communication paths optically couples a given one of the N number of nodes with another of the N number of nodes, wherein each node of the N number of nodes sends optical signals to n number of nodes within a specified distance of a sending node of the N number of nodes over one of the number of optical communication paths, wherein each of the n number of nodes receives one of the optical signals provided by the sending node, where n is at least two and less than N;
wherein a given optical communication path of the number of optical communication paths is configured to divert a portion of a given optical signal broadcast by the sending node of the N number of nodes to a communication port of an optical mezzanine card at a given one of the n number of nodes, and wherein the optical backplane is configured to divert another optical signal generated by the communication port at the optical mezzanine card onto another optical communication path of the number of optical communication paths.

12. The computer system of claim 11 wherein the given and another optical signals further comprise packets that are used to send data between nodes over the optical fabric.

13. The computer system of claim 11 wherein the given and another optical signals further comprise packets that are destined for one or more of the N number of nodes.

14. The computer system of claim 11 wherein the optical fabric enables each of the N number of nodes to receive packets from the n number of nodes with the specified distance over the optical communication paths driven by the n number of nodes, each of the N number of nodes configured to discard packets that are not destined for the respective node.

15. The optical fabric of claim 1, wherein the given optical communication path terminates at two or more unique points, wherein each of the two or more unique points of the given optical communication path is optically coupled to a respective one of the at least two or more receiving nodes; and wherein the another optical communication path terminates at two or more unique points, wherein each of the two or more unique points of the another optical communication path is optically coupled to a respective one of the at least two or more receiving nodes.

16. The optical fabric of claim 3, wherein the given optical communication path terminates at two or more unique points, wherein each of the two or more unique points of the given optical communication path is optically coupled to a respective one of the at least two or more receiving nodes; and wherein the another optical communication path terminates at two or more unique points, wherein each of the two or more unique points of the another optical communication path is optically coupled to a respective one of the at least two or more receiving nodes.

17. The computer system of claim 11, wherein each of the optical communication paths has n number of unique termination points that are each optically coupled to a given one of the N number of nodes.

18. The system of claim 17, wherein n is equal to N minus 1.

\* \* \* \* \*